Jan. 12, 1932.  H. L. TANNER  1,841,341
MEANS FOR PRODUCING INDICATIONS
Filed Nov. 17, 1923  3 Sheets-Sheet 1
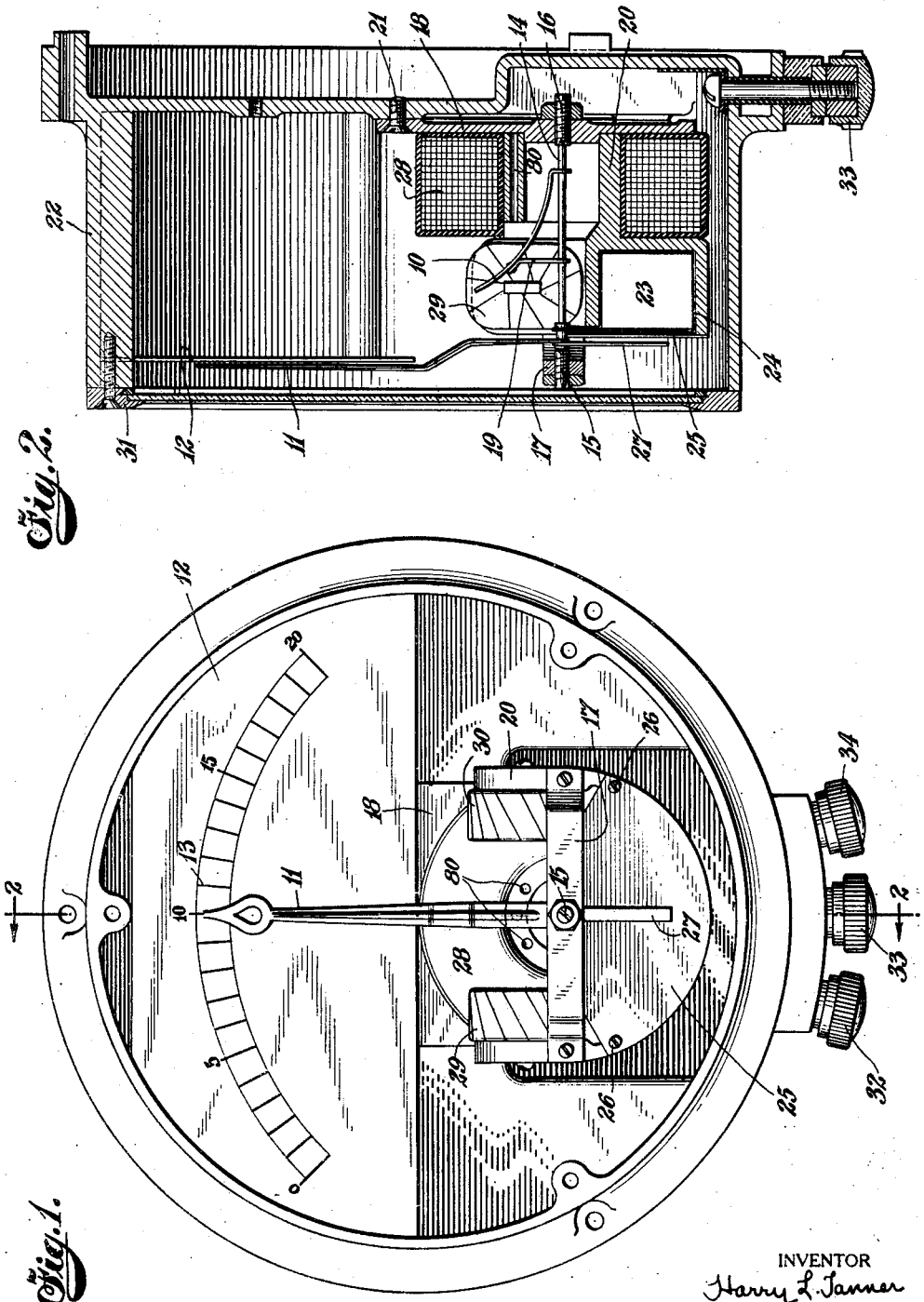

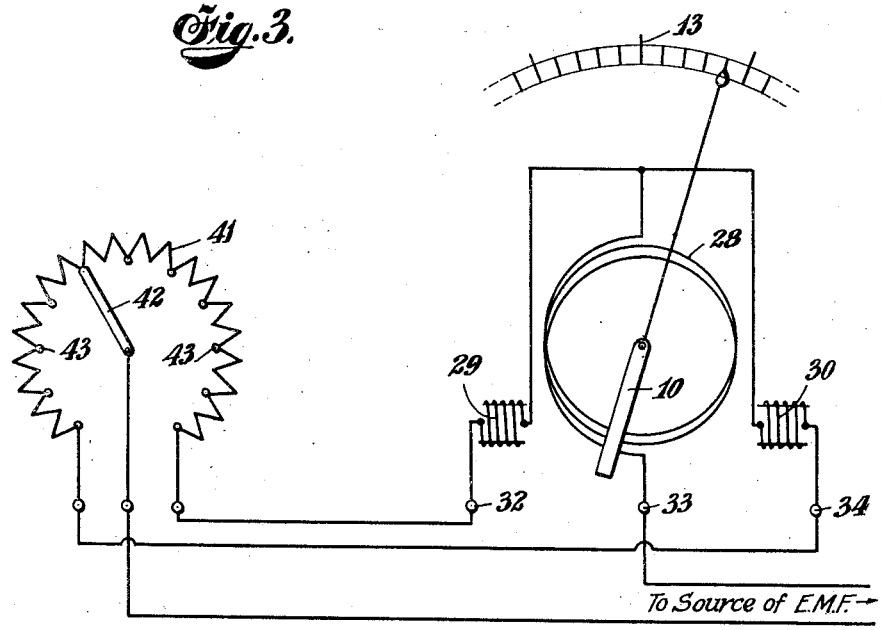

Jan. 12, 1932.  H. L. TANNER  1,841,341
MEANS FOR PRODUCING INDICATIONS
Filed Nov. 17, 1923  3 Sheets-Sheet 3
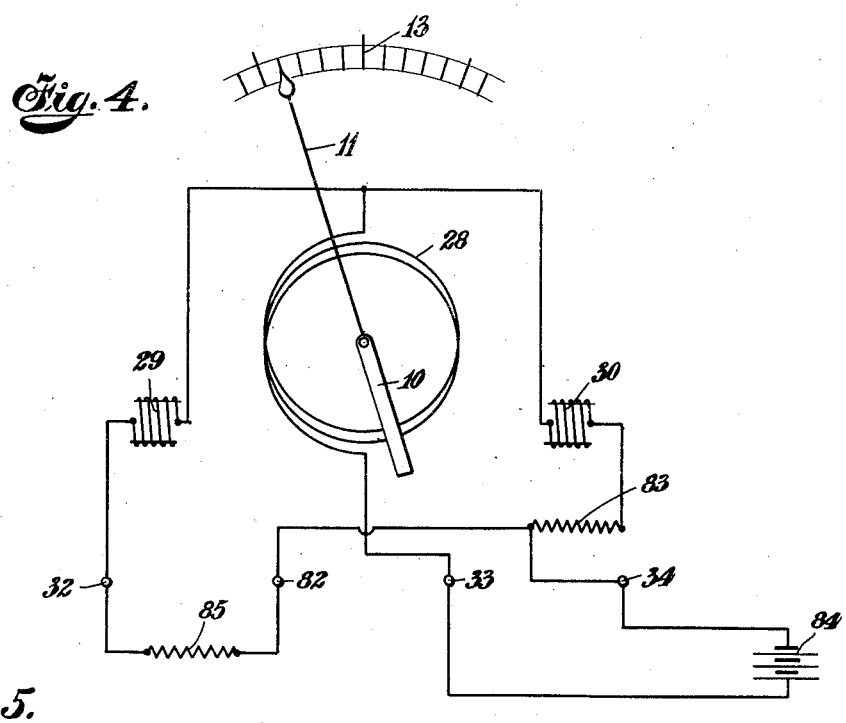
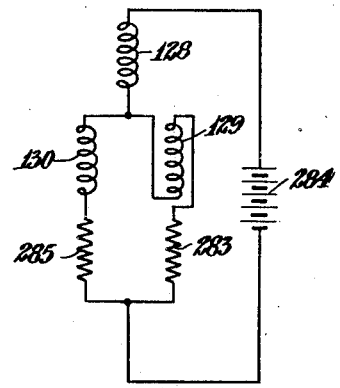
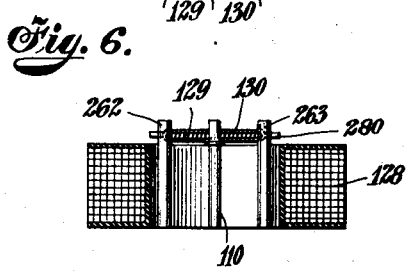
INVENTOR
Harry L. Tanner
BY Cooper, Kerr + Dunham
his ATTORNEYS Patented Jan. 12, 1932

1,841,341

UNITED STATES PATENT OFFICE

HARRY L. TANNER, OF BROOKLYN, NEW YORK; THE NATIONAL CITY BANK OF NEW YORK, EXECUTOR OF SAID HARRY L. TANNER, DECEASED, ASSIGNOR, BY MESNE ASSIGNMENTS, TO WALLACE & TIERNAN PRODUCTS, INC., OF BELLEVILLE, NEW JERSEY, A CORPORATION OF NEW JERSEY

MEANS FOR PRODUCING INDICATIONS

Application filed November 17, 1923. Serial No. 675,428.

This invention relates to indicating instruments. More specifically it relates to visual indication-producing instruments, i. e., instruments adapted to produce visual indication, and has for its objects to provide a novel method of and means for controlling a movable element of such instruments.

Another object is to provide a novel ohmmeter.

Further objects are to provide a novel telemetric system and novel instruments and devices for use in such systems. Still further objects and advantages will appear as my invention is hereinafter disclosed.

Referring to the drawings which illustrate what I now consider preferred forms of my invention:

Fig. 1 is a front elevation of one form of indication-producing instrument.

Fig. 2 is a section taken substantially on the line 2—2 of Fig. 1.

Fig. 3 is a wiring diagram illustrating one of the uses of the invention.

Fig. 4 is a diagrammatic view illustrating the indication-producing instrument employed as an ohmmeter.

Fig. 5 is a partially diagrammatic plan view of a modified form of indication-producing instrument.

Fig. 6 is a section taken substantially on the line 9—9 of Fig. 5.

Fig. 7 is a wiring diagram showing the connections for employing the instrument, shown in Figs. 5 and 6, as an ohmmeter.

Referring to Figs. 1 and 2, it will be seen that the visual indication-producing instrument there illustrated comprises a movable element 10 which controls a pointer or index 11 forming one of the parts of an indicating couple of which the other part consists of a dial 12 having a scale or graduations 13. The element 10, which is constructed of soft iron or other suitable magnetizable material, and the pointer 11, which is constructed of aluminum or other suitable material, are mounted upon and fixedly secured to a shaft 14 preferably constructed of hard steel, although other material such as bronze may be employed. The shaft 14 is shown journaled at its opposite ends in screws 15, 16, which are adjustable respectively on the bridge 17 and plate 18, both preferably constructed of aluminum. It will be noted that the movable element 10 is in the shape of a curved strip (seen in side elevation in Fig. 2) having its lower end secured to the shaft 14 and braced intermediate its ends by a tie rod or strip or wire 19 secured at one end to the shaft 14 and at its other end to the element 10. The bridge 17 is shown connected by screws at its opposite ends to a frame 20, preferably also constructed of aluminum, which is suitably secured to the plate 18. The latter is secured, by means of one or more screws 21, to the inside of the back of the cylindrical casing 22, which is constructed of any suitable material, such as aluminum or brass. It will be noted that the dial 12, of cardboard or other suitable material is secured to and within the casing 22 in such position that the pointer sweeps over it.

In order to damp the oscillations of the movable element 10 and pointer 11, the following mechanism is preferably provided. The shaft 14 has secured thereto an air damper or vane 23 which, when the shaft oscillates, moves back and forth in a housing or air chamber 24 provided in the frame 20 and adapted to be substantially sealed by the cover plate 25 secured to said frame, as by means of screws 26. It will be understood of course that the vane and its supporting element do not engage the frame 20 nor the cover 25 in the swinging movement of the former, except possibly at the opposite extremes of movement of the pointer 11, the design being such that the vane 23 tends to compress air ahead of it in moving to and fro in the chamber 24, the air escaping around the edges of the vane into the portion of the chamber behind the vane. In this manner the pointer 11 is quickly brought to rest to any of its various indicating positions.

Preferably the shaft 14 and system of elements carried thereby are so designed that the center of gravity thereof lies upon or substantially upon the axis of oscillation of the shaft. To this end the shaft may be provided, if necessary with a counterbalance 27 secured thereto.

While a permanent magnet might be employed, in at least some forms of the instrument, as the movable element 10, I prefer to construct the said element of soft iron and to provide means for magnetizing it. One form of such means is shown in Figs. 1 and 2 and may be constructed as follows: A coil or helix of wire 28 is mounted upon a cylindrical hollow hub portion of the frame 20, between the plate 18 and that portion of casing 20 which forms the rear wall of the chamber 24. Obviously the coil 28, when energized by passing electric current therethrough, constitutes a source of magnetomotive-force and will pass flux through the movable element 10 from end to end, i. e., magnetize the movable element.

Means are provided for coacting with the coil 28 to impress oppositely acting forces of magnetic repulsion upon the movable element 10 of the instrument. A now preferred form of such means is illustrated in Figs. 1 and 2 and comprises the helically or spirally wound magnet coils 29 and 30. These coils are shown mounted upon the frame 20 upon opposite sides of the element 10 which moves between them.

As will hereinafter more fully appear, the coils 28, 29 and 30 are so energized that the magnetic polarity of the inner ends of the coils 29 and 30 (i. e. the ends nearest the movable element 10) is the same and the same as the polarity of that end of the coil 28 which lies nearest the pointer 11. Each of the coils 29 and 30 will therefore repel the movable element and, if the system of parts is symmetrical about the vertical plane 2—2 (Fig. 1), equal ampere-turns of the coils 29 and 30 will cause the element 10 to assume mid position. So long as the ampere-turns of one coil 29 or 30 are the same as that of the other, the element 10 and pointer 11 will remain in mid position. The reason for this is that any tendency of the element 10 to move away from this position of equilibrium is opposed by the coils 29 and 30. This movement of the element 10 toward either coil causes that coil to repel the element 10 more strongly, while the force of repulsion of the other coil is diminished. If the ampere-turns of either of the coils 29 and 30 is varied with respect to the other of said coils 29 and 30, the movable element 10 will assume a new position of equilibrium dependent upon the relative strength of the ampere-turns of each of these two coils 29 and 30, with respect to the other. Thus if the ampere-turns of the coil 29 are greater than the ampere-turns of the coil 30, the movable element 10 will move to the right (Fig. 1) to a new position of equilibrium depending upon the difference in strength of said coils. If the ampere-turns of the coil 30 are greater than the ampere-turns of the coil 29, the movable element 10 will move in the opposite direction. In any event the element 10, and consequently the pointr 11 will assum any one of various positions depending upon the relative strength of the coils 29 and 30.

It will be noted that the only parts of magnetic or magnetizable material are the element 10 and the shaft 14 and, as stated above, the latter may, if desirable, be made of non-magnetizable material. The instrument is shown provided with a detachable cover plate 31 provided with a window through which the scale 13 and pointer 11 may be viewed. It is also preferably provided with terminals or binding posts 32, 33, 34, insulated from each other and from the casing 22.

Among other uses the instrument described above is admirably adapted to be employed in a telemetric system as shown diagrammatically in Fig. 3 in which the parts 10, 11, 13, 29, 30, 32, 33 and 34, will at once be recognized in view of the foregoing description. A rheostat comprising a resistance, or series of resistances, 41, and an arm adapted electrically to engage any one of a series of studs 43, connected at spaced points to the resistance 41, may be located at a position remote from the indicating instrument. The electrical connections illustrated may be described as follows. The terminal 33 and arm 42 are connected to a suitable source of E. M. F. which may be either unidirectional or alternating. The terminal 33 is connected to one end of the coil 28, the other end of which is connected to one end of each of the coils 29 and 30. The other ends of the coils 29 and 30 are each connected to a corresponding end or end stud of the resistance or series of resistances 41. It will be noted that the connections of the coils 28, 29, and 30, are as described above, i. e., so that the polarity of the inner ends of the coils 29 and 30 (Figs. 1 and 3) is the same and the same as the front end of the coil 28. Thus if the polarity of that end of the element 10 which lies between the coils 29 and 30 is north (or south) at any instant of time the polarity of the inner ends of the coils 29 and 30 will be north (or south) at that time. In other words, the coils 29 and 30 each repel the element 10 and these forces of repulsion act in opposite directions.

It should be remembered that the position of equilibrium of the element 10 depends upon the relative magnitude of the ampere-turns in the coils 29 and 30. If the turns in the coil 29 are equal in number to those in coil 30—the coils 29, 30 are preferably so constructed—then the position of equilibrium of the element 10 will depend upon the relative strength of currents in said two coils 29 and 30. But, upon inspection of Fig. 3, it will be seen that relative strength of currents in the two coils 29 and 30 depends upon the position of the movable arm 42. The scale 13 may therefore be calibrated to indicate, in cooperation with the pointer 11, positions of the remotely located arm 42 or any device connected thereto. Thus the arm 42 may be connected to a float and the system employed to indicate depth of liquid.

Many of the advantages of the indication-producing instrument shown in Figs. 1 and 2 will now be appreciated in view of the foregoing description. It will be noted further that the instrument may be mounted vertically, as shown, or horizontally. It is accurate, reliable and efficient. It is practically a "dead beat" instrument, the damper 23—24 proving quite effective to bring the pointer to rest quickly.

If desirable certain refinements may be embodied in the indicating instrument. Thus in order to control the character of calibration of the scale 13—i. e. whether it is to be uniform or non-uniform, as desired—the spool portion of the frame 20 is shown provided with a plurality of openings 80 (Figs. 1 and 2) into which soft iron wires may be inserted as desired.

Bearing in mind that the arm 42 (Fig. 3) may be actuated or controlled by means other than a float, it will be understood that the telemetric system may be adapted to uses other than the remote indication of liquid level or depth. Furthermore the instrument shown in Figs. 1 and 2 may be employed as an ohmmeter. When so employed the connections shown in Fig. 4 may be adopted.

Referring to Fig. 4 the elements 10, 11, 13, 28, 29, 30, 32, 33 and 34 will at once be recognized in view of the description of Figs. 1, 2 and 3. The following changes should, however, be noted. A standard resistance 83 is permanently connected between the coil 30 and the terminal 34 within the instrument. A jumper is connected across the terminal 34 and an additional terminal 82. The external connections also differ from those shown in Fig. 3. The unknown resistance 85—i. e. the element whose resistance is to be measured—is connected across the terminals 32—82, and a suitable source of E. M. F., such as a storage battery 84, is connected across the terminals 33—34.

The operation of the instrument as an ohmmeter is substantially as follows: As described in connection with Figs. 1, 2 and 3, the movable element 10 (and consequently the pointer 11) will assume a position depending upon the relative magnitude of the forces of repulsion exerted upon the element 10 by the coils 29 and 30. The relative value of these forces depends, in the arrangement shown in Fig. 4, upon the relative resistance of the standard resistance 83 and the unknown resistance. The scale 13 may therefore be calibrated to read ohms or fractions thereof. Thus, if the instrument be so calibrated, the unknown resistance is simply connected, as shown, and a direct reading of the resistance read in ohms or fractions of ohms upon the scale 13, the pointer indicating the reading to be taken.

The invention is susceptible to modification in various respects without departing from the scope of at least some of the appended claims. Thus instead of constructing the indicating instrument as shown in Figs. 1 and 2 it may be constructed as shown in Figs. 5, 6 and 7 to which reference will now be made.

The coil 128, shaft 114, pointer 111, and scale 113, correspond to the coil 28, shaft 14, pointer 11, and scale 13, shown in Figs. 1 and 2. Instead of employing a movable element 10 in the form of a strip of soft iron, a movable element consisting of a soft iron rod 110 is secured to an arm secured to the shaft 114, and extends downwardly through the coil 128. It will be apparent that when the coil 128 is energized, the movable element 110 will be magnetized. The following means are provided for impressing the oppositely acting forces of magnetic repulsion upon the movable element 110 and for varying the relative strength of such forces.

A pair of soft iron rods 262 and 263 are fixedly mounted within the stationary coil 128, one on either side of the shaft 114. A stationary U-shaped bar 280 of soft iron is mounted with its opposite ends adjacent the upper ends of the rods 262 and 263. Magnetizing coils 129, 130, which oppose each other are wound upon the bar 280.

The electrical connections of the elements in order to employ the instrument as an ohmmeter are shown in Fig. 7, in which the reference numerals 283, 284, and 285, designate the unknown resistance, a storage battery, and a standard resistance, respectively. While the operation of the instrument, so connected, will now be apparent to those skilled in the art in view of the foregoing description, it may be summarized as follows.

When the coils 129 and 130 are of equal strength, the movable element or bar 110 will be equally repelled by the like poles of the rods 262 and 263 and hence will be centralized. As soon as one coil 129 or 130 becomes stronger, however, the U magnet 280 will weaken one rod 129 or 130 and strengthen the other, thereby causing proportional displacement of the movable element 110 and the connected pointer 111.

Except for difference in reference numerals employed, Figs. 5, 6 and 7, of the present application are identical to Figs. 3, 4 and 5 of my copending application, Serial No. 552,077, filed April 13, 1922, and now Patent No. 1,587,050, patented June 1, 1926, the two instruments so disclosed being the same. The present application is therefore a continuation in part of my prior application referred to.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim is—

1. An indicating instrument comprising in combination, an indicating couple, a movable element of magnetizable material controlling said couple, means including a stationary winding for impressing a magneto-motive-force upon said element, and means for magnetically repelling said element in opposite directions.

2. An indicating instrument comprising in combination, an indicating couple, a movable element of magnetizable material controlling said couple, a stationary winding for impressing a magneto-motive-force upon said element, and means comprising a pair of windings for repelling said element in opposite directions.

3. An indicating instrument comprising in combination, a magnetizable element mounted for movement about an axis, an electromagnet into which said element extends, an electromagnet for repelling said element in one direction about said axis, an electromagnet for repelling said element in the opposite direction about said axis, and an indicating element actuated by said movable element.

4. An indicating instrument comprising in combination, a shaft, a pointer secured to said shaft, an element of magnetizable material secured to said shaft, said shaft and the structure carried thereby having the center of gravity located substantially on the axis of said shaft, a stationary electromagnet into which said element extends, a stationary electromagnet having a core of non-megnetizable material and mounted on one side of said element, a stationary electromagnet having a core of non-magnetizable material and mounted upon the other side of said element, and energizing means for causing said two last mentioned electromagnets to repel said elements in opposite directions.

5. An indicating instrument comprising in combination, visual indication-producing means including a movable element, a magnetizable member connected to said element, means including a winding for impressing a magneto-motive force upon said member, and electromagnetic means for repelling said member in opposite directions, said electromagnetic means including a coil wholly located on one side of said member and a coil wholly located on the opposite side of said member.

6. An indicating instrument comprising in combination, an indicating couple, a movable element controlling said couple, means including a winding for impressing a magneto-motive force upon said element, means including an electromagnet for magetically repelling said element in one direction, and means including an electromagnet for magnetically repelling said element in the opposite direction, both poles of one of said electromagnets being located on one side of said element and both poles of the other of said electromagnets being located on the opposite side of said element.

7. An indicating instrument comprising in combination, an indicating couple, a movable element of magnetizable material controlling said couple, means including a stationary winding for impressing a magneto-motive-force upon said element, and means for magnetically repelling said element in opposite directions, said last mentioned means including a pair of substantially coaxial coils spaced apart in the direction of their axes and located on opposite sides of said element.

8. An indicating instrument comprising in combination, an indicating couple, a movable element controlling said couple, and means comprising a pair of windings for magnetically repelling said element in opposite directions, said pair of windings being axially spaced from each other and so connected that their adjacent poles are like poles.

9. An indicating instrument comprising in combination, an indicating couple, a movable element of magnetizable material controlling said couple, a stationary winding for impressing a magneto-motive-force upon said element, and means comprising a pair of windings for repelling said element in opposite directions, said pair of windings being axially spaced from each other and so connected that their adjacent poles are like poles.

10. An indicating instrument comprising in combination, a magnetizable element mounted for movement about an axis, an electromagnet into which said element extends, an electromagnet for repelling said element in one direction about said axis, an electromagnet for repelling said element in the opposite direction about said axis, and an indicating element actuated by said movable element, the said electromagnets being so mounted that the flux axes of the two last mentioned electromagnets lie in a plane perpendicular to the axis of movement of said element and perpendicular to the flux axis of the first mentioned electromagnet.

11. An indicating instrument comprising in combination, an indicating couple, a movable element controlling said couple, means including a winding for impressing a magneto-motive force upon said element, and means comprising a pair of windings for magnetically repelling said element in opposite directions, said pair of windings being axially spaced from each other and so connected that their adjacent poles are like poles.

In testimony whereof I have hereunto affixed my signature.

HARRY L. TANNER.